Patented Aug. 14, 1951

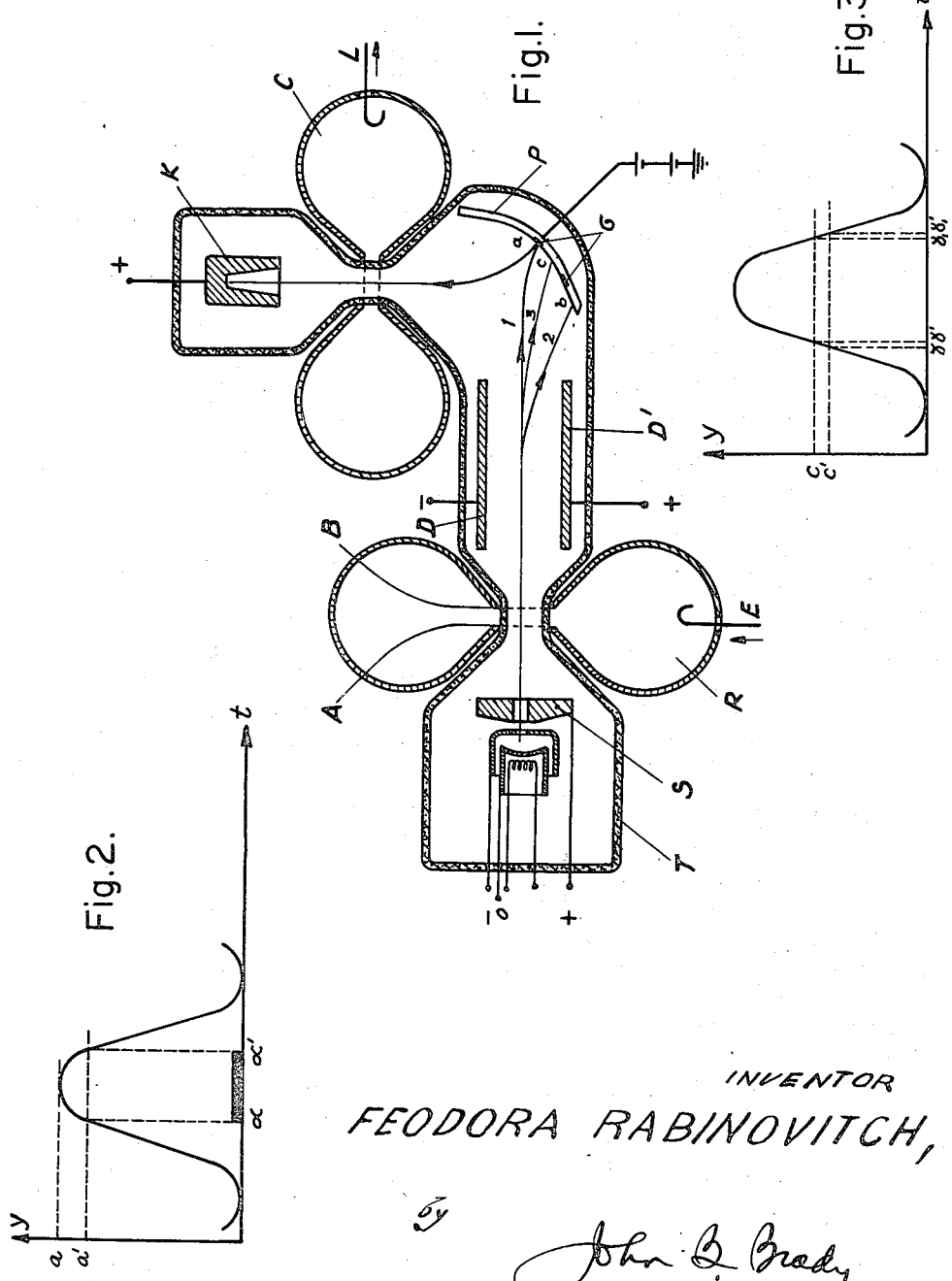

2,564,277

UNITED STATES PATENT OFFICE 2,564,277

VELOCITY MODULATION DEVICE USING SECONDARY EMISSION FOR DENSITY MODULATION OF AN ELECTRONIC BEAM

Féodora Rabinovitch, London, England, assignor to Compagnie Generale de Telegraphie Sans Fil, a corporation of France Application July 14, 1947, Serial No. 760,908
In France May 7, 1946

Section 1, Public Law 690, August 8, 1946
Patent expires May 7, 1966

5 Claims. (Cl. 315—6)

This invention relates to an arrangement for obtaining from a primary electronic beam which is velocity modulated by using a phenomenon of secondary emission a beam the density modulation of which is of the form and the frequency desired. More particularly this secondary beam may be emitted as pulses at a frequency which is either equal to that of the velocity modulation of the primary beam or a multiple thereof.

According to the invention the velocity modulated primary beam is subjected to the action of an electric or magnetic field and caused to sweep a surface of secondary emission in such a manner that the secondary emission that is supplied varies as a function of time.

The invention is hereinafter described with reference to the accompanying drawings which illustrate the principle of the invention by way of example, among which Fig. 1 is a diagram which explains the process according to the invention; and Figs. 2 and 3 are diagrams explaining the operating principle of the secondary emission conducting target used in the device according to the invention.

The device shown in Fig. 1 contains in an envelope T, an electron gun S which sends a beam across the grids A and B of an apparatus which produces velocity modulation. This apparatus may be practically embodied in the form of rhumbatron R of the Klystron of the current type, excited to ultra high frequency by loop E.

At the outlet of this rhumbatron, the velocity modulated beam is subjected to the action of a transversal deviation device, employing in the example of the drawing an electric field produced between the plates DD', this field being constant in space and time. It is however understood that an equivalent system with a magnetic field, or the combination of an electric and a magnetic field, may be employed without thereby departing from the scope of the invention.

The deflected electron beam falls on a conductive target P where the secondary emission power varies from point to point. This effect can be obtained by covering the target, or certain parts of its circuit, with secondary emission material, leaving uncovered spaces between the parts covered with this material, or, also, by covering the surface with several materials having different secondary emission powers.

The target P returns the secondary beam to a collector K across the grids of an energy tapping rhumbatron C, coupled to the load by loop L.

Voltages of suitable polarity and value are applied to the passages leading to the collector, the target, the deflection plates, the cathode and the focussing electrode gun, for the purpose of giving the secondary electrons such velocities and directions as are required.

In order to explain the operation of the arrangement referred to, it will be assumed that use is made of a very narrow electronic beam and for instance of homogeneous density and the velocity of which is sufficiently strongly modulated by AB. This beam when subjected to the electric field produced by DD'—which field we will assume to be constant—is deflected transversely with respect to its original direction, the deflection being naturally a function of the speed of the electrons which arrive in the field. As this speed varies with the time, the deflection will also vary during time with the frequency of the velocity modulation. The phenomenon would be analogous if the electric field were replaced by a magnetic field. In Fig. 1 there is shown three electronic trajectories corresponding to three different speeds; the trajectories 1 and 2 being respectively those of the most rapid and of the slowest electrons, and the trajectory 3 being that of the electron having an intermediate speed.

The target for the secondary emission P will be swept by the electronic beam and if the velocity modulation is continuous as it is in the case of the present practice, the portion $ab$ of the target will be traversed during the to and fro movement of the beam in the corresponding period of the velocity modulation. If the target comprises a layer of secondary emission $\sigma$ at the level of $a$ or $b$ the target P emits secondary electrons once per period. If $\sigma$ is at an intermediate point, at $c$ for example, the target P emits secondary electrons during the passage of the primary beam at $c$, that is to say twice per period and at equal intervals of time if $c$ is suitably placed. Generally speaking, in order to have $n$ secondary emissions during the period it suffices to place on the target emitting layers at $n/2$ points if $n$ is an even number $(n+\frac{1}{2})$ points if $n$ is an odd number. In this case one of these layers has to be at one of the two extreme points $a$ or $b$.

In the case when the target is wholly covered by emitting substances, the coefficient of emission of which varies when there is a displacement between $a$ and $b$, there is obtained a secondary emission which varies in intensity during the sweeping; one can thus obtain a secondary beam the density modulation of which will have the desired aspect provided that the target is suitably arranged and has a suitable shape and that the different emitting layers are suitably disposed.

In order to obtain a more definite idea of the phenomenon it will be sufficient to consider a diagram showing the time $t$ as abscissae and the distance $y$ of the point of impact of the beam to the extreme point $b$ in ordinates. From the diagram there is observed a periodic curve the period of which is equal to that of the speed modulation—of the kind indicated in Fig. 2. The shape of this curve depends essentially from the shape of the target P and its position. One can thus vary the shape to a large extent. Besides the period, the only stable characteristics of this curve, that is to say independent of the shape and the position of the target of secondary emission, are the following: it admits as axes of symmetry the parallels to the axis of the ordinates passing through its maximum and its minimum; and any parallel to the axis of the abscissae cuts it only at two points during one period.

If the target P comprises a layer of secondary emission at the level of $a$ of a predetermined width $aa'$ the cathode will emit during time interval $aa'$. If the target comprises (Fig. 3) an emitting surface at $c$ of the width $cc'$ the plate will emit twice per period $\gamma\gamma'$ and $\gamma_1\gamma_1$ etc.

If the beam has a certain width the observations are analogous, but the emission is longer. As ordinarily it is desirable to obtain a short sweep of each emitting layer in order to obtain a substantial density modulation use is made of a primary beam which is very narrow in a direction parallel to the deflection. Moreover in order that the strength of the emission should be substantial one must use a primary beam which is flat, that is to say narrow in the direction parallel to the deflection and at the same time wide in the transverse direction perpendicular to the deflection, in which case the emitting layers are in the form of a series of narrow streaks elongated in a direction perpendicular to the plane of Fig. 1.

The arrangement hereinbefore described has numerous applications. More particularly the secondary beam, suitably focussed, may be sent over the electrodes of a collecting member C (Fig. 1) constituted for example by a cavity wherein it induces high frequency energy; in this way one can obtain either a frequency multiplier if the secondary beam comprises $n$ bunches per period or a collector which transforms the quasi-total of the kinetic energy of the secondary electrons into high frequency energy if the modulation of the beam is suitably adapted (Fig. 1).

I claim:
1. Apparatus for transforming a velocity modulated electronic emission into an emission of variable intensity, comprising an envelope containing in the order named means for generating an electron beam, means for modulating the velocity of the electrons of the beam, means for transversely deviating the velocity-modulated beam as a function of the velocity of the electrons, an electrode subjected to the impact of the deviated beam and covered with a layer of substances of secondary-emission power variable at different points of its surface, and collecting means for the secondary electron flow of intensity varying in time emitted by the said layer.

2. Apparatus for transforming a velocity modulated electronic emission into an emission of variable intensity, comprising an envelope containing in the order named, means for generating an electron beam, means for modulating the velocity of the electrons of the beam, means for transversely deviating the velocity-modulated beam as a function of the velocity of the electrons, an electrode subjected to the impact of the deviated beam and covered with a secondary emission substance layer in several regions of its surface separated from each other by non-emitting regions, and collecting means for the secondary electron flow successively emitted by the said emitting regions at the time of their periodic impact with the primary electron beam.

3. Apparatus for transforming a velocity modulated electronic emission into an emission of variable intensity, comprising an enevelope containing in the order named, means for generating an electron beam, means for modulating the velocity of the electrons of the beam, means for transversely deviating the velocity-modulated beam as a function of the velocity of the electrons, an electrode subjected to the impact of the deviated beam and covered with a layer of substance having power of secondary emission variable according to a continuous law along its surface, and collecting means for the secondary electron flow of an intensity varying in time emitted by the said layer.

4. Apparatus for transforming a velocity-modulated electronic emission into an emission of variable intensity, comprising an envelope containing in the order named means for generating a flat electron beam, means for modulating the velocity of the electrons of the beam, means for deviating the velocity-modulated beam transversely to its plane as a function of the velocity of the electrons, an electrode subjected to the impact of the deviated beam and covered with a layer of substance with secondary emission power variable at different points of its surface, and collecting means for the secondary electron flow of an intensity varying in time emitted by the said layer.

5. Apparatus for transforming a velocity-modulated electronic emission into an emission of variable intensity, comprising an envelope containing in the order named, means for generating a flat electron beam, means for modulating the velocity of the electrons of the beam, means for deviating the velocity-modulated beam transversely to its plane as a function of the velocity of the electrons, an electrode subjected to the impact of the deviated beam and covered with a secondary emission layer of substance in at least one region in the form of a striation parallel to the plane of the beam, and collecting means for the secondary electron flow emitted by the said striation at the time of the periodic impact with the primary electron beam.

FÉODORA RABINOVITCH.

REFERENCES CITED

The following references are of record in the file of this patent:

UNITED STATES PATENTS

| Number | Name | Date |
|---|---|---|
| 2,069,441 | Headrick | Feb. 2, 1937 |
| 2,156,435 | Schroter et al. | May 2, 1939 |
| 2,408,423 | Hartley | Oct. 1, 1946 |
| 2,409,179 | Anderson | Oct. 15, 1946 |
| 2,416,302 | Goodall | Feb. 25, 1947 |
| 2,416,303 | Parker | Feb. 25, 1947 |
| 2,438,709 | Labin et al. | Mar. 30, 1948 |